United States Patent [19]

Barrett

[11] Patent Number: 5,323,813
[45] Date of Patent: Jun. 28, 1994

[54] REMOVABLE RECREATIONAL VEHICLE SANITARY DRAIN CONNECTOR

[76] Inventor: William Barrett, 110 Sunflower Rd., Perkinston, Miss. 39574

[21] Appl. No.: 72,719

[22] Filed: Jun. 7, 1993

[51] Int. Cl.[5] ......................... F16K 27/12; F16L 3/00
[52] U.S. Cl. .................................. 137/899; 138/155; 285/302
[58] Field of Search ........................ 137/899; 285/302; 138/106, 155, 178

[56] References Cited

U.S. PATENT DOCUMENTS

| | | | |
|---|---|---|---|
| 3,623,500 | 11/1971 | Hoy | 137/899 |
| 4,233,702 | 9/1980 | Cook | 137/899 |
| 4,779,650 | 10/1988 | Sargent et al. | 137/899 |

*Primary Examiner*—A. Michael Chambers
*Attorney, Agent, or Firm*—Alexander F. Norcross

[57] ABSTRACT

A compact, easily stowed removable drain line for a Recreational Vehicle holding tank provides a rigid straight line flow path to prevent puddling or trapping of waste flows between Recreational Vehicle holding tank and sewage dump station. The invention also provides for minimal force transfer into the holding tank structure and the drain valve, minimizing the possibility of accidental damage or rupture of these sensitive components. In particular, no exposed components exist during movement of the Recreational Vehicle, minimizing the risk of breaching of sewage during over road movement, and the invention particularly protects against damage from accidental movement of the vehicle while attached to the sewage dump station.

3 Claims, 1 Drawing Sheet

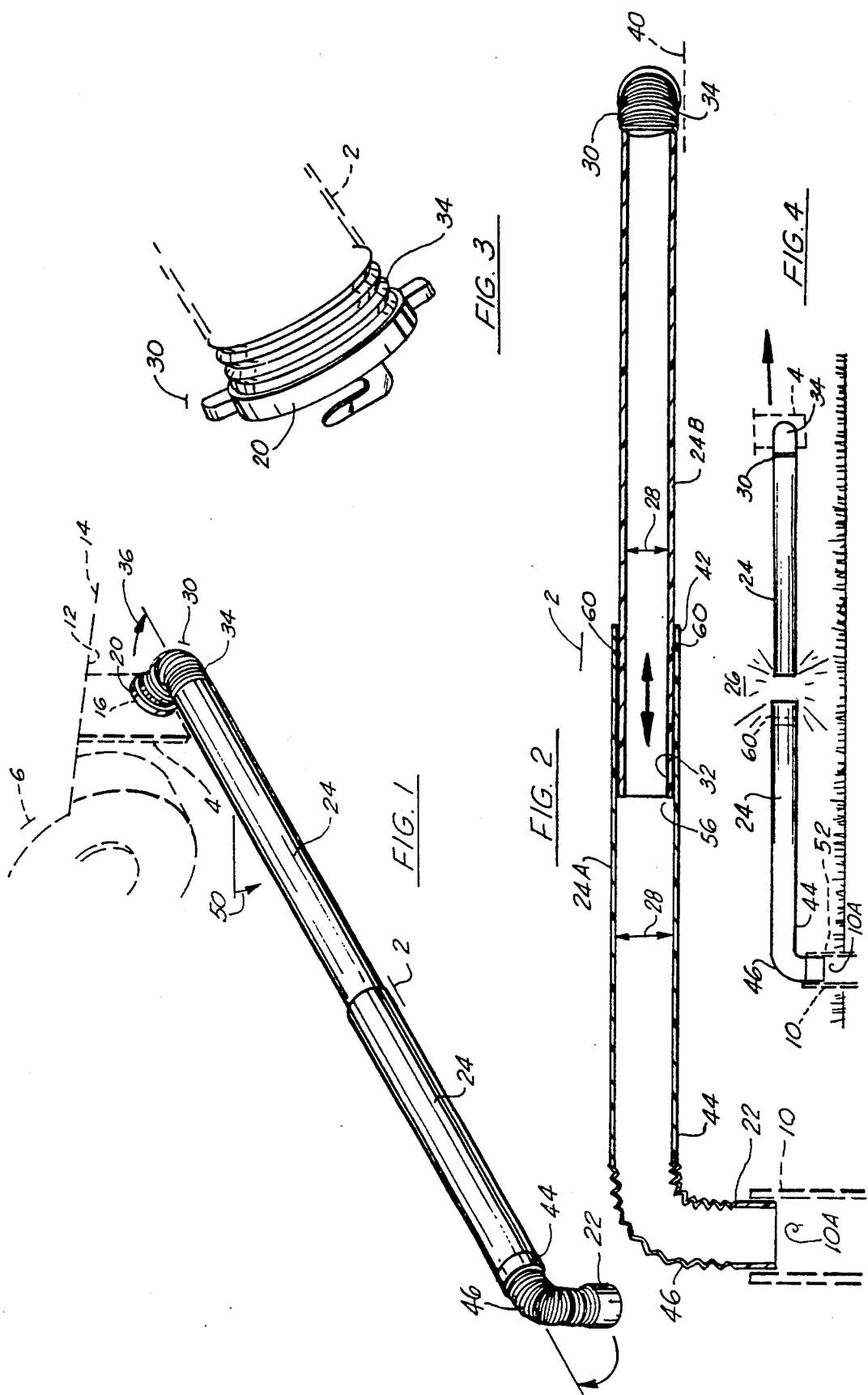

REMOVABLE RECREATIONAL VEHICLE SANITARY DRAIN CONNECTOR

BACKGROUND OF THE INVENTION

This invention relates to the field of drain apparatus for emptying sanitary holding tanks installed in recreational vehicles and travel trailers. Such vehicles contain toilets and other sources of sanitary sewage; being mobile, the collected sewage is stored in holding tanks which must be emptied periodically. Most Recreational Vehicle parking facilities, trailer parks and many on road servicing establishments have suitable sewage dump station facilities, usually in the form of a ground level connection into which sewage may flow or be pumped.

Since the holding tank on a Recreational Vehicle must be located at a lowest point on the vehicle for gravity flow of sewage, the drain is similarly low. Thus the drop from vehicle drain to sewage dump station is quite small. This results in puddling and trapping of sewage in lines draining from the vehicle. In consequence, there is spillage of sewage, and contamination which is difficult to clean.

This has led to the abandonment of flexible bellows tubing as a drain line, and the adoption of various structures in an attempt to obtain a suitable drain apparatus.

U.S. Pat. No. 2,915,081 to Warren discloses a permanently affixed telescoping drain showing a construction in which each successive pipe section is larger than its preceding section. Both ends of the pipe are rigid, and the connection to the trailer is a pivoting joint. The device is suspended below the trailer. Seals and locknuts are described to hold the telescoping sections together. This unit is most similar to the telescoping device shown in the sales catalog you disclosed.

U.S. Pat. No. 4,133,347 to Mercer discloses a removable drain in which a bellows tube is held in a rigid tube. This patent clearly discloses the use of the standard removable fittings on each end of the drain to fit to standard trailer and sewage dump station connections. The actual drain tubing is the known bellows extensible tubing.

U.S. Pat. No. 4,854,349 to Foreman discloses a fixed tubing section, permanently affixed to the underside of the camper, and containing an extensible bellows tube for connection to a sanitary sewage dump station.

U.S. Pat. No. 3,623,500 to Hoy discloses a semicircular conduit for supporting a bellows drain line to prevent sag and to guide the drain line.

U.S. Pat. No. 5,023,959 to Mercer (the inventor in the '347 patent above) discloses a motorized system for extending a bellows drain tube and then for pulling back on the bellows once it is connected to the sewer pump out to reduce sag.

U.S. Pat. No. 4,844,121 to Duke discloses a drain line which is attachable to a trailer drain outlet, and which has a series of rigid telescoping tubes. The tubes nest, smaller inner tube nearer the trainer; the tubes are locked together with a compression nut. Rigid inlet and outlet connectors are shown, and a washout connection for a water hose is provided on the inlet connector. Standard interconnects are shown (FIG. 4, item 50).

U.S. Pat. No. 4,779,650 to Sargent et al. shows a rigid telescoping tube drain, permanently affixed to the trailer. This patent shows a bellows outer covering which seals the sliding joints, but the device is a continuous telescoping rigid tubing construction, including rigid rotating joints at the trailer end.

U.S. Pat. No. 5,141,017 to Trottier shows a fitting for connecting a drain to a trailer sanitary system with a hose connection and valve for back flushing the line. This design is an improvement over the flush shown in Mercer '347 as it permits blockages in the dump valve to be cleared as well as cleaning the line after dumping.

U.S. Pat. No. 3,496,959 to Wolfe is a early design for a telescoping drain tube made of rigid sections.

U.S. Pat. No. 2,514,230 to Feazel is an earlier patent showing a vehicle drain.

The current art is permanently mounted rigid plastic telescoping lines affixed to the trailer holding tank through a ball joint and valve. These lines are, of necessity, the lowest mounted portions of the Recreational Vehicle or trailer. They are invariably made of plastic, to avoid corrosion and failure, and are therefore fragile. Any damage to these lines as by impact or thrown road debris, can breach the integrity of the entire sewage holding system, rendering the entire toilet and drain system in the Recreational Vehicle unusable. Such accidents can equally result in major sewage spills and contamination.

SUMMARY OF THE INVENTION

The invention provides a compact easily stowed removable drain for a Recreational Vehicle holding tank, while at the same time providing for a rigid straight line drop in the flow path to prevent puddling or trapping of waste flows between holding tank and sewage dump station. The invention also provides for minimal force transfer into the holding tank structure and the drain valve, minimizing the possibility of accidental damage or rupture of these sensitive components. In particular, no exposed components protrude during movement of the Recreational Vehicle, minimizing the risk of breaching of sewage during over road movement, and the invention particularly protects against damage from accidental movement of the vehicle while attached to the sewage dump station.

It is thus an object of the invention to show a drain apparatus for interconnection a Recreational Vehicle sanitary holding tank and a sewage dump station that is removable for over road movement of the vehicle.

It is a further object of the invention to show a drain apparatus for interconnection a Recreational Vehicle sanitary holding tank and a sewage dump station that minimizes trapping of sewage during the drain process.

It is a further object of the invention to show a drain apparatus for interconnection a Recreational Vehicle sanitary holding tank and a sewage dump station that is particularly compact for storage between uses.

It is a further object of the invention to show a drain apparatus for interconnection a Recreational Vehicle sanitary holding tank and a sewage dump station that is easily cleaned for storage.

It is a further object of the invention to show a drain apparatus for interconnection a Recreational Vehicle sanitary holding tank and a sewage dump station that minimizes the chance for impact damage to the vehicle holding tank and drain valve.

These and other objects of the invention may be seen from the detailed description of the invention which follows.

BRIEF DESCRIPTION OF THE FIGURES

FIG. 1 is a view of an extended tube of the invention as connected between vehicle and ground.

FIG. 2 is a side sectional view of the invention.

FIG. 3 is a detailed view of the standardized coupling of the invention.

FIG. 4 is a view of the invention showing free decoupling without force being transmitted to the coupling ends.

DETAILED DESCRIPTION OF THE INVENTION

The invention is a drain line 2 for connection between the drain valve 4 of a Recreational Vehicle 6 sanitary sewage holding tank (not shown) and a ground mounted sewage dump station 10. In general, Recreational Vehicles 6 have a sanitary holding tank installed at a lower point 12 on the vehicle frame 14. This holding tank receives and holds all drain water and sewage from installed plumbing and sanitary systems in the vehicle 6. For reasons of economy and cleanliness, the majority of such tanks are constructed of plastic.

At a lower point 16 of the holding tank, a drain valve and fitting 18 is installed to permit the tank to be drained. The connection fittings have become standardized in the industry, and a specialized three inch diameter bayonet socket 20 is now universally employed to connect drain lines 2 to the drain valve and fitting 18

The requirement that such sanitary wastes as are contained in a holding tank be correctly disposed of has led to the provision of specialized Recreational Vehicle (RV) Sewage Dump station or pump out facilities 10 at truck stops, recreational vehicle parks and travel trailer parks. "Pump out" is a slight misnomer; RV sewage dump stations 10 are usually gravity flow connections to waste treatment plants or to municipal sewer systems. In general, they comprise a ground level concrete slab with a capped hole 10A into which a drain hose 22 may be placed. All transfer of waste fluids from holding tank to sewage dump station is by gravity flow.

Since it is usual for the sewage dump station 10 to be up to twenty feet away from the closest parking spot available for the vehicle 6 being emptied, and since the holding tank drain 16 is at the lowest point 4 on the vehicle body, a very low drain angle exists and any obstruction in the drain line 2 will create puddling of wastes, and stop complete flow. Any such trapped wastes must be flushed into the sewage dump station 10 drain; this is such a common problem that water hoses are provided to permit such flushing. Obviously after repeated uses the area around a sewage dump station 10 can become exceedingly unpleasant.

The invention is a drain line 2 comprised of a series, usually two, of telescoping rigid plastic tubes 24, tightly slip fit together, but otherwise unrestrained in their extension. It is important to the invention that the telescoping tubes 24 will, if pulled far enough, slide freely apart 26. When the telescoping tubes 24 are assembled, each will be a slightly different size, stepping up in diameter 28 as more tubes 24 are joined. In the invention the larger tube 24A is towards the sewage dump station drain 10 end of the drain line 2.

The smallest diameter tube 24B is the vehicle end 30 tube. One end 32 of this tube 24B telescopes into its adjacent telescoping tube 24A; the other, or vehicle end 30, has a permanently attached short sewer hose or bellows section 34 attached. This vehicle sewer hose or bellows end 34 is restricted in length, being of the minimum length that will permit it to be bent to up to but not significantly beyond a ninety degree angle 36 from the centerline of the rigid telescoping tubes 24, but sufficiently short so that it does not support significant extension or downward droop 40 under load. This sewer hose or bellows section 34 is a reinforced bellows, as it will support the entire weight of the telescoping tubing 24 and all sewage flowing in the invention 2. At the end of the sewer hose or bellows 34 not fastened to the telescoping tube 24B is a permanently fastened bayonet adapter 20 for interconnection to the standard vehicle holding tank drain fitting 16.

The largest telescoping tube 24A is slidingly connected at one end 42 to the series of telescoping tubes 24 by enclosing the adjacent such tube 24B; at its other end 44, the largest tube 24A is fixedly connected to a single length of flexible sewer hose or bellows 46, constructed of the same type bellows material used at the vehicle end 30. Again, the length of sewer hose or bellows 46 is restricted to that necessary to form a ninety degree bend; although at this sewage dump station 10 end, a slightly larger length of sewer hose or bellows 46 will not be deleterious.

A seal gasket 60 which prevents release of odors may be installed on the inner surface of the largest tube 24A at or adjacent to the tube end 42. In simplest form this gasket may be several layers of plastic tape, forming a slip seal gasket. Alternately, gasket 60 may be a standard rubber or plastic gasket or "O" ring inset in a groove within the largest tube 24A to form a sliding seal against the smaller telescoping tube 24B. Again, if multiple such telescoping tubes 24 are used, such a gasket 60 would be installed in each outer tube 24.

The sewage dump station 10 end of the sewer hose or bellows 46 forms the drain end 22. In use the drain end 22 is inserted into the opened sewage dump station drain opening 10A. The sections of telescoping tubing 24, which are normally stored in assembled, collapsed form, inserted one into the next, are then extended until the vehicle end 30 reaches the vehicle drain 16. The vehicle drain adapter 20 is then lifted and turned to attach the assembled drain tube 2 to the vehicle holding tank drain 16. The vehicle end sewer hose or bellows 34 has sufficient flexibility that the drain adapter 20 may be easily turned enough to interlock with the drain 16 without turning or twisting the drain line 2.

The sewer hose or bellows 34 length at the vehicle end 30 is, as stated above, restricted to that minimum necessary to permit the drain adapter 20 to be attached and telescoping tube 24 to be bent to the direction of the drain line 2 run. As a result, the amount of droop 40 is minimized, and the vehicle end 30 of the rigid telescoping tube sections 24 is raised to form the best possible drain angle 50, considering the limited fall from the vehicle holding tank drain 16 to the ground level 52, for free flow of sewage to the sewage dump station drain 10. The telescoping tubes 24 form a rigid run without any low spots to pool sewage. Further, by locating the smaller tube 24B towards the vehicle end 30, the small lip 56 formed by the end 32 of each innermost tube 24 in sequence does not form a trap for liquid wastes and the drain line 2 drains clean.

After the holding tank has been drained, the drain adapter 20 may be unlocked; due to the flexibility of the vehicle end sewer hose or bellows 34, this twisting does not disturb the telescoping tube section 24. The vehicle end 30 is then raised and flushed with water to clean the entire drain line 2.

The entire drain line 2 may then be collapsed together into a unitary tube section or, in the alternative disassembled, for storage. The collapsed drain line 2 is handled as a single rigid plastic tubing section; it is light in weight and easily cleaned. There are no supports, extra couplings or loose components to be handled or lost; in its simplest form the collapsed invention 2 consists of a single tubing section, easily handled by a single person.

No permanent plastic drain installation remains below the frame of the recreational vehicle. Therefore, there is no protruding apparatus to be damaged by impact with road obstructions or road debris. Most critically, there is no rigid coupling into the drain coupling 16 or into the vehicle's permanently installed holding tank, and therefore no possibility, through accident, of damaging these critical components. Rigid or permanent drain lines have been known to transmit impact forces into the drain, cracking open the holding tank; such damage renders the vehicle largely inoperative for living or camping and cannot be repaired except at the vehicle's manufacturer.

As an additional safety feature, the incidence of drivers inadvertently driving or moving the vehicle while it is connected to the sewage dump station drain is unfortunately common. The invention does not restrain the movement of the telescoping tubes, and if such an event occurs, the drain line 2 merely pulls apart, minimizing damage to the vehicle sanitary system.

It can thus be seen that the invention is of a particularly simple and safe drain apparatus 2 for draining recreational vehicle 6 holding tanks, minimizing the number of component parts of the prior art drain lines, while avoiding the damage risks of the prior art rigid drain lines. The invention is considered to include the ability to remove the drain line after use, and to extend to all equivalents inherent in that simple but effective system of the claims.

I claim:

1. A drain line for draining a recreational vehicle holding tank into a ground level drain comprising:

at least two tightly fit, freely sliding telescoping rigid tubes, successively a smaller tube within a larger tube, extending from a vehicle end to a drain end; the larger tube towards the drain end.

a short flexible bellows section affixed to the vehicle end of the telescoping tubes, means on the bellows section for connection to the holding tank for waste fluid flow;

a short flexible bellows section affixed to the drain end of the telescoping tubes.

2. The drain line of claim 1, the bellows section affixed to the vehicle end being restricted in length to the minimum length necessary to form a maximum ninety degree bend from the line of the rigid tubes.

3. The drain line of claim 1, the telescoping tubes being freely telescoped, such that no resistance is presented to the tubes being fully pulled apart into separate sections.

* * * * *